UNITED STATES PATENT

[19] Shin

[11] Patent Number: 5,307,454
[45] Date of Patent: Apr. 26, 1994

[54] APPARATUS FOR EXTRACTING LOCAL IMAGE FROM ORIGINAL IMAGE

[75] Inventor: Jae-Sub Shin, Seoul, Rep. of Korea

[73] Assignee: Samsung Electronics Co., Ltd., Rep. of Korea

[21] Appl. No.: 982,386

[22] Filed: Nov. 25, 1992

[30] Foreign Application Priority Data

Apr. 28, 1992 [KR] Rep. of Korea .................. 92-7152

[51] Int. Cl.$^5$ ............................................. G06F 15/62
[52] U.S. Cl. ................................. 395/133; 395/134; 395/162; 382/22
[58] Field of Search .................. 395/133–139, 395/162–164, 141, 145, 149; 379/88; 382/22, 50, 27; 364/DIG. 1

[56] References Cited

U.S. PATENT DOCUMENTS

| 4,103,331 | 7/1978 | Thacker | 364/DIG. 1 |
| 4,852,020 | 7/1989 | Morita | 395/141 |
| 4,868,884 | 9/1989 | Miyazaki et al. | 382/22 |
| 4,873,570 | 10/1989 | Suzuki et al. | 358/80 |
| 4,907,274 | 3/1990 | Nomura et al. | 379/88 |
| 5,087,968 | 2/1992 | Omi et al. | 358/75 |
| 5,091,967 | 2/1992 | Ohsawa | 382/22 |
| 5,119,439 | 6/1992 | Osawa et al. | 382/27 |
| 5,129,053 | 7/1992 | Makihara | 395/149 |

Primary Examiner—Heather R. Herndon
Assistant Examiner—Almis Jankus
Attorney, Agent, or Firm—Weingram & Zall

[57] ABSTRACT

An image processing apparatus extracts a local image from an original image which is supplied by an image input unit, the local image corresponding to a local area, designated by a coordinate data input unit, and being supplied to an image output unit. The apparatus extracts local image data by using coordinate data associated with boundary pixels positioned in boundary lines between the local image and other parts of the original image. The extracted local image data are then provided to the image output unit in accordance with horizontal and vertical synchronizing signals applied from a generator.

13 Claims, 10 Drawing Sheets

APPARATUS FOR EXTRACTING LOCAL IMAGE FROM ORIGINAL IMAGE

BACKGROUND OF THE INVENTION

1. Field of the Invention

The present invention relates to an image processing system and, more particularly, to an image extracting apparatus employed in an image processing system, which separates a local image corresponding to an arbitrary image area designated by a coordinate data input device, such as a graphics tablet, from an original image received through an image graphic input device, such as a scanner, a digital copier or the like.

2. Description of the Prior Art

A typical color image processing apparatus for selectively altering image color is described in U.S. Pat. No. 4,873,570 which issued on Oct. 10, 1989. The image processing apparatus has a color appointing device which enables an operator to appoint any desired color involved in an original image, a color range changing device for manually or automatically changing the size of range of the colors which can be regarded as being the same as the predetermined color, a target color appointing device for appointing a color to which the predetermined color is to be converted, and a color image forming device such as a laser beam printer for forming a color image with the predetermined color and colors in the color range converted into the target color.

Further, a digital color copier with color separation processing is disclosed in U.S. Pat. No. 5,087,968 which issued on Feb. 11, 1992. With this color separation processing employed by the digital color copier, an image reproducing copy is prepared by applying color separation to an original image of an original and processing color component signals for each of the separated colors into recording information. The color copying machine can increase the speed and efficiency of multiple copies and can provide a symmetric copy mode, a swap or inverting copy mode and a multiple image copy mode.

In such a typically conventional technique, a bit stream is defined such that a logic bit "1" is allocated to an interior of an area where coordinate data designating the extracted area is inputted from a coordinate data input device, while a logic bit "0" is allocated to an exterior of the area. Sequentially, the bit stream is logically produced with the picture image data supplied from the picture image input data to extract the desired local picture image.

However, this technique requires a separate memory having the same capacity as the amount of the picture image data supplied from the image input device to define the bit stream. As a result, a cost of embodying the memory is increased undesirably.

To overcome this drawback, a method has been proposed in which only coordinate data of the designated image area is stored in a predetermined memory and the bit stream is then defined by scanning lines when the picture image data corresponding to the designated area is input to extract the picture image of the desired image area. However, there is a problem in that the image area is partially designated with limited format.

SUMMARY OF THE INVENTION

Accordingly, a principle object of the present invention is to provide a picture image extracting apparatus which can arbitrarily extract a local image by using the coordinate data of pixels positioned on a boundary of the designated image area without effecting a bit stream process, or reducing a memory capacity to be undesirably lost.

Another object of the present invention is to provide an image extracting apparatus which determines an output format of picture data contained in the designated image area by using control signals and processes, the output format being in real time and which can be used as an image designating module in a high-speed image processing system.

A further object of the present invention is to provide an image extracting apparatus in which a designated image is not limited in a format.

To achieves the above objects, according to the present invention there a system control program to generate control signals for said apparatus; a central processing unit to operate said system control program; a decoder responsive to said control signals to indicate a beginning and an end of an image extraction process; storage means for storing coordinate data of boundary pixels positioned at boundary lines between said local image and another portion of said original image; correcting means for correcting designated error from uncorrected designation of said local image, such that said coordinate data can be stored in said storage means; sorting means for sorting said coordinate data stored in said storage means as x-coordinate data and y-coordinate data with respect to x-y coordinates; first detecting means for detecting a plurality of pixels having continuously varying values of x-coordinate with respect to a constant value of y-coordinate, wherein said detecting means removes other varying values except a minimum value of said continuously varying values; second detecting means for detecting data corresponding to maximum and minimum inflected points of said x-y coordinates from coordinate data wherein said data corresponding to said maximum and minimum inflected points is removed; generating means for generating horizontal and vertical synchronizing signals which control said image input unit to provide said local image, said local image being extractable based upon data unremoved from said coordinate data and supplied to said image input unit; a latch circuit adapted to temporarily latch said synchronizing signals supplied from said generating means; an OR gate circuit adapted to logically said synchronizing signals supplied from said latch circuit and provide an output signal; and a data buffer circuit adapted to temporarily store said coordinate data corresponding to said local image in accordance with said /utput signal of said OR gate circuit.

According to the present invention, an arbitrary local image can be extracted by using the coordinate data related to the pixels on the boundary of the designated area.

Preferably, according to the present invention, the area to be designated is not limited in a format. The objects, features and advantages of the present invention will be apparent from the following description taken in conjunction with the accompanying drawings.

DETAILED DESCRIPTION OF THE INVENTION

A preferred embodiment of the present invention will be described in detail.

Figure 1:
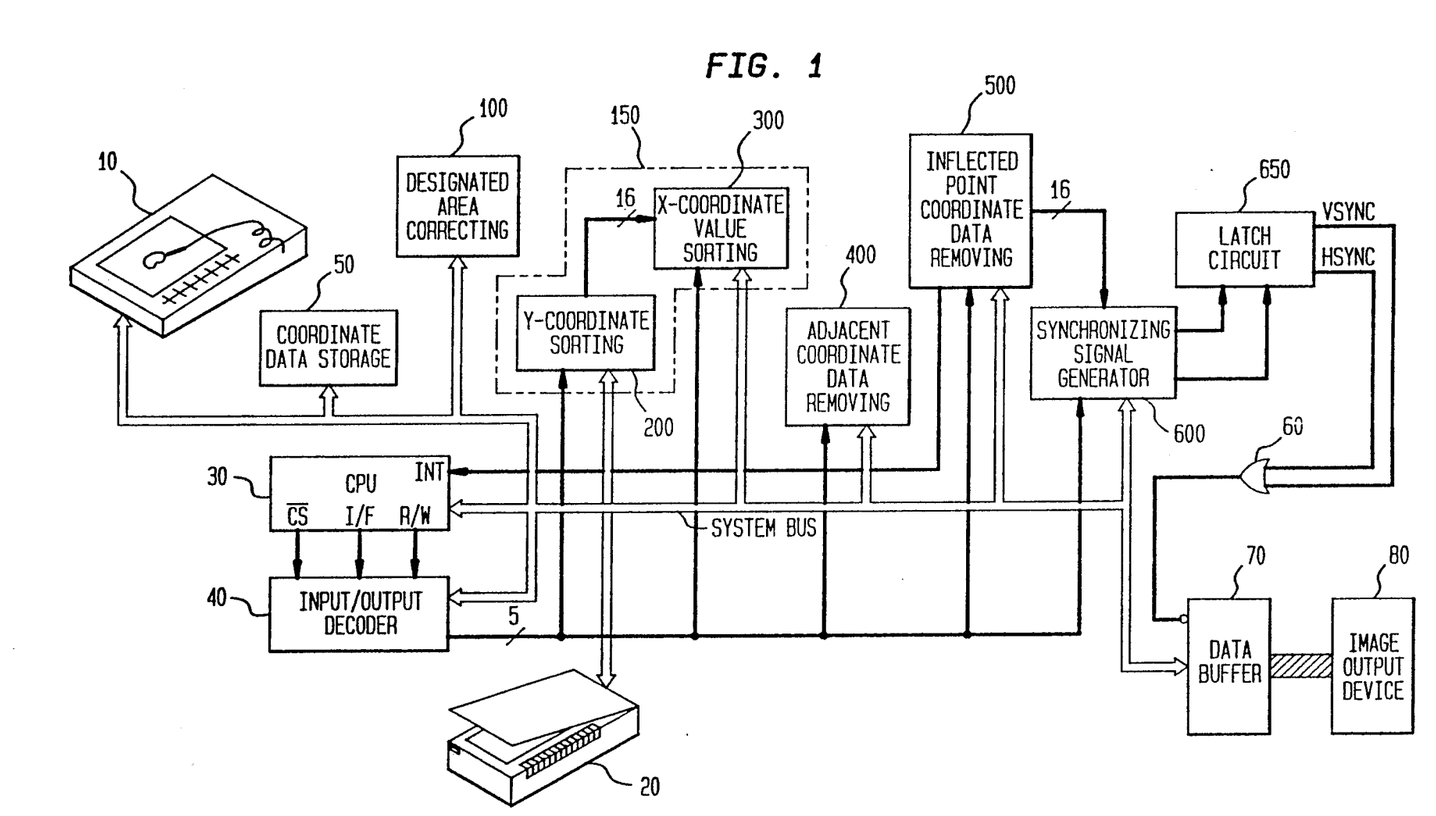
FIG. 1 is a schematic block diagram of an image processing system embodying the present invention.

Referring to FIG. 1 showing a schematic block diagram of an image processing system according to the present invention, 10 denotes a coordinate data input device which is employed to designate an image area to be extracted, 20 denotes an image input device, 30 denotes a central processing unit (CPU) which controls the entire system and executes various operation functions and 40 denotes an input/output decoder which decodes data which, in turn, is inputted from the data input device or is outputted through a data output device.

Numeral 50 denotes a coordinate data memory which stores coordinate data taken on the boundary of the designated area, 70 denotes a data buffer, 80 denotes the image output device, 100 denotes a designated area correcting portion, 150 denotes a data sorting portion which sorts the data in order, 400 denotes an adjacent coordinate data removing portion which removes adjacent coordinate data, 500 denotes an inflected point coordinate data removing portion. 600 denotes a synchronizing signal generator, and 650 denotes a latch circuit.

As seen from FIG. 1, all of the circuit components according to the present invention are connected to each other through a system bus.

The start and end timing of the process executed by the components are determined under a control of the input/output decoder 40 which is controlled by the CPU 30.

The operation of the present invention will be described below.

First, the coordinate data of the pixels positioned on the boundary of the area which is designated by the coordinate data input device 10 are sequentially stored into the coordinate data memory 50. After the storage of the coordinate data, the CPU 30 informs the completion of the storage of the coordinate data to each of the processors through the input/output decoder 40, and then executes the program stored in the designated area correcting portion 100 to check an error in the designation of a area. As the result, if the error is checked, then the CPU corrects the error in the designation of the area.

The detection and correction procedures of the designated area will be described in detail by referring to FIG. 2.

The designated area from which the local image is extracted has to be preferably defined in a form of a closed loop, such as a circle having the start and end points coincided with each other. However, it is difficult for a user to expect that the designated area is defined in a form of a closed loop. The designated area defined by a user has generally, a form as shown in FIGS. 2(a) or (b). More specifically, the area to be subjected to extraction of an image is substantially designated in a closed loop having a start point S, an intersection P and an end point Q, as shown in FIG. 2(a). Alternatively, the area is also likely to be designated in an open loop of which a start point and an end point are different from each other and an intersection P is not present, as shown in FIG. 2(b).

In the former case, undesired curves must be removed between the intersection P and the start point S and between the intersection P and the end Q. In the latter case, it is required to obtain an equation on a straight line extended through the start point S and the end point Q and then supplement the line between the start point S and the end point so as to form a completely closed loop.

Figures 2A, 2B, 2C:
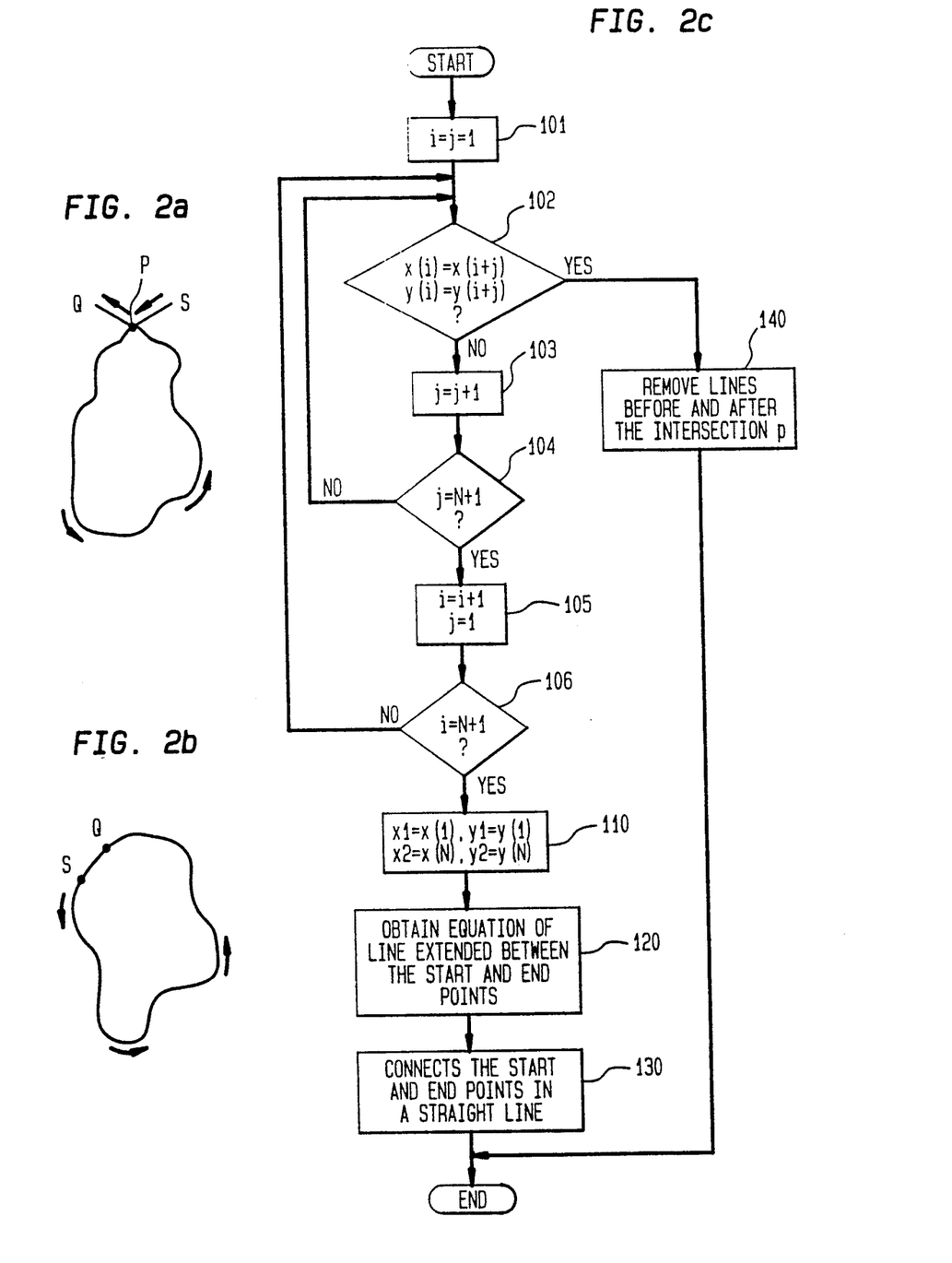
FIG. 2(a) to (c) includes a flowchart illustrating the process of detecting and correcting the designated area according to the present invention.

Referring to FIG. 2(c), the process of detecting and correcting the designated area will be described in more detail.

Assuming that the total number of the coordinate data on the boundary is N, if the X- and Y-coordinate values of data on a specified coordinate are X(i) and Y(i), respectively, then the coordinate data at the start point S on the boundary are set to X(1) and Y(1), and the coordinate data at the end point Q are set to X(N) and Y(N), respectively. Consequently, the CPU 30 reads the coordinate data on the boundary of the designated area from the coordinate data memory 50 in order to check the presence of the intersection P. Next, the CPU 30 receives the first coordinate data X(1) and Y(1) of multiple boundary data and reads in the immediately sequential coordinate data X(2) and Y(2) to decide the identity therebetween (102). If the coordinate data are different from each other, then the CPU 30 receives the next coordinate data to decide the identity therebetween (steps 102 to 104), and the previously mentioned comparison is repeatedly executed until the final coordinate data is compared. More specifically, if the check of the first coordinate data is completed, then the second coordinate data is checked in the same manner as that previously mentioned.

After the check of the second coordinate data, the check is continuously executed to the third, fourth, ... and the final coordinate data X(N) and Y(N) so as to decide the intersection.

While the intersection is detected during the check, that is, if YES at the step 102, the coordinate data corresponding to a curve defined between the start point S and the intersection P and that corresponding to a curve defined between the intersection P and the end point Q are removed from the coordinate data memory 50 (step 140).

When the designated area is formed in an open loop in which no intersection is present (i.e., YES at the step 106) as shown in FIG. 2(b), then the coordinate data X(1) and Y(1) of the start point S are assigned to parameters X1 and Y1, respectively, while the coordinate data X(N) and Y (N) of the end point Q are assigned to different parameters X2 and Y2, respectively (step 110).

Next, the CPU 30 defines a formulation of a straight line extended between the start point S and the end point Q by using the following equation of the straight line (step 120);

$$Y-Y2=Y2-Y1/X2-X1\cdot(X-X2)$$

Consequently, in a rectangle defined by values X1, Y1; X2, Y1; X1, Y2; X2, Y2, new coordinate data corresponding to the straight line equation are additionally stored into the coordinate data memory 50 (step 30). After the correction of the designated area as described above, the CPU 30 supplies a control signal to the data sorting portion 150 through the input/output decoder 40 to execute the coordinate data sorting.

This coordinate data sort is executed in an ascending series such that the y-coordinate value of the coordinate data is first sorted and the X-coordinate value of the coordinate data having the same value as that of the y-coordinate is then sorted.

Figure 3:
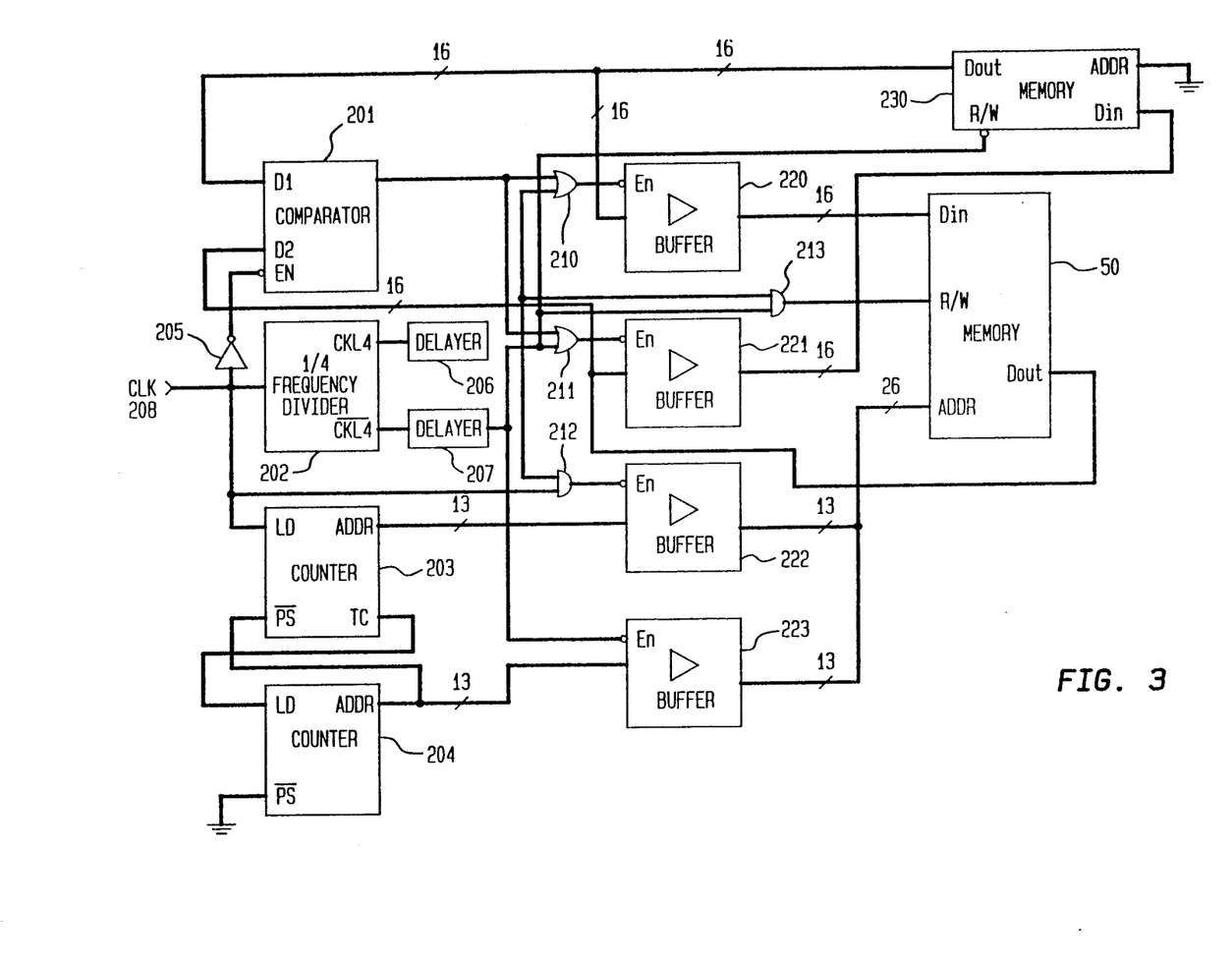
FIG. 3 is a view showing an embodiment of a data sorting portion in FIG. 1.

FIG. 3 is a block diagram of a preferred example of the data sorting portion 150 shown in FIG. 1.

Referring to FIG. 3, the data sorting portion 150 comprises a comparator 201, a memory 50, four buffers 220 to 223, counters 203 and 204, a frequency divider 202, delayers 206 and 207, and logic gate circuits 205, 210 to 213.

The delayers 206 and 207 are connected to a positive output terminal CLK 4 and negative output terminal CLK 4 of the frequency divider 202 which divides clock signals CLK by ¼, respectively.

An enable terminal En of the comparator 201 is connected to an inverter 205 which inverts the clock signals CLK. One D1 of input terminals of the comparator 201 is connected to an output terminal Dout of the memory 230, and the other D2 is connected to an output terminal Dout of the coordinate data memory 50. One of the input terminals of the OR gate circuit 210 and 211 is connected to the output terminals of the comparator 201 while the others are connected to the output terminals of the delayers 206 and 207, respectively.

Moreover, an AND gate circuit 212 has an input terminal connected to a clock terminal 208 and a different input terminal connected to an output terminal of the delayer 206.

The counter 203 has a load port LD the clock terminal 208 and thirteen output terminals ADDR coupled to corresponding input terminals of the buffer 222. The counter 204 has a preset terminal PS connected to a ground potential and a load port LD connected to a ripple carry terminal TC of the counter 203. The counter 204 has thirteen output terminals ADDR coupled to corresponding input terminals of the buffer 223. The most significant bit of the output terminals of the counter 204 is connected to the preset terminals $\overline{PS}$ of the counter 203.

The output terminals of the buffer 220 are coupled to the corresponding output terminals Dout of the memory 230, respectively and the output terminals of the buffer 221 are connected to output terminals of the coordinate data memory 50. The inputs of the memory 230 are coupled to the outputs of the buffer 221 and the inputs of the coordinate data memory 50 are coupled to the outputs of the buffer 220. Each of enable terminals En of the buffers 220 to 222 is connected to the corresponding output of the gate circuits 210 to 212 and the enable terminal En of the buffer 223 is connected to the output of the delayer 207.

The operation of the data sorting portion 150 thus constructed will be described in detail.

As previously mentioned, if the designation of the image area to be extracted is properly corrected by the designated area correcting portion 100, then CPU 30 supplies an instruction to the data sorting portion 150 through the input/output decoder 40 so that the data sorting portion 150 executes the given funnction, for example, the coodinate data sorting. At this time, the clock signal CLK is supplied to the data sorting portion 150 which, in turn, executes the coordinate data sort in such a way that y-coordinate value is firstly subjected to the data sorting process and X-coodinate value is sequentially subjected to the data sorting process. The process of sorting the y-coordinate data of the coodinate data stored in the coordinate date memory 50 is achieved by the following process. That is, the counted output of the counters 203 and 204 is entered into the buffers 222 and 223 for which output signals are supplied to the coordinate data memory 50 as addresses for accessing the memory 50. As the counters 203 and 204 are started to execute the given operation, the coordinate data, which is aleady stored in the addressed area of the coordinate data memory 50 in correspondance to the output of the counters 203 and 204, is transferred from the coordinate data memory 50 to the input D2 of the comparator 201 and, at the same time, the minimum coordinate data stored in the memory 230 is supplied to the input D1 of the comparator 201.

The memory 230 stores data having the maximum coordinate value during the presently executed process. That is, the coordinate data having the minimum value in the multiple coordinate data prior to the comparison of the coordinate values is stored in the memory 230.

The comparator 201 functions to compare the y-coordinate value (hereinafter, a comparable coordinate value) stored in the coordinate data memory 50 at a position designated by the counters 203 and 204 and the y-coordinate value (hereinafter, a referential coordinate value) of the coordinate data supplied from the memory 230. If the comparable coordinate value is larger than the referential coordinate value, the comparator 201 produces a high level output.

Accordingly, the OR gate circuits 210 and 211 produce a high level output, respectively and the buffers 220 and 221 are thus disabled. As a result, new coordinate data in an addressed area corresponding to the outputs of the counters 203 and 204, supplied through the buffers 222 and 223 out of the buffers 220 and 221 which are non-operated, is transferred from the coodinate data memory 50 to the comparator 201.

If the comparable coordinate value newly supplied from the coordinate data memory 50 is smaller than the referential coordinate value, then the comparator 201 produces a low level output and the outputs of the OR gate circuits 210 and 211 thus become low level by the ¼ divided clock signal delayed through the delayers 206 and 207, respectively. Accordingly, both the buffers 220 and 221 are in an enable state. At this time, the coordinate data supplied from the coodinate data memory 50 is stored in the memory 230 as new minimum coordinate data and the coordinate data is stored in the address area of the coordinate data memory 50 designated by the counter 203.

The counter 203 is reset to logic "0" or "low" level after the comparable coordinate value and the referential coordinate value are compared with each other by the comparator 201. The counter 204 is increased by 1 every time the completion of the address designation is in a range that is defined by the counter 203.

When the total number of the coordinate data stored in the coordinate data memory 50 is N, since the most significant bit output of the counter 204 is connected to the preset terminal $\overline{PS}$ of the counter 203, the present minimum coordinate data of the y-coordinate value is selected after the total coordinate data N are counted by the counter 203 and then stored in the address "0" of the coordinate data memory 50.

Consequently, the count value of the counter 203 is set at "1" under this condition, while the counter 203 counts the N−1 data and the present minimum coordinate data of the y-coordinate value is selected and stored in the address 1 of the coordinate data memory 50.

Next, the count value of the counter 203 is set at 2 and then counts the N−2 data. As a result, new coordinate data is registered into the address 2 of the coordinate data memory 50.

If the counting operation is repeatedly executed up to the N×N data by way of the counter 203, the coordinate data to the y-coordinate value is re-sorted within the area as designated by the addresses 0 to N−1 in an ascending series.

After the coordinate data related to the boundary of the designated area is re-sorted corresponding to the y-coordinate values in an ascending series as described above, the X-coordinate value is then re-sorted with the same principle as that of the y-coordinate value excluding that the re-sorting process is executed between the coordinate data having the same y-coordinate values.

Accordingly, the re-storing operation of the coordinate data to the X-coordinate values is similar to the arrangement shown in FIG. 3 and, therefore, the detailed description will be omitted.

Once the coordinate data is re-sorted so as to extract the desired local image, the remaining coordinate data from the data of the minimum X-coordinate value are removed by the adjacent coordinate data removing portion 400 from the multiple coordinate data of which y-coordinate values are equal to each other and X-coordinate values are continuous.

Figure 4A:
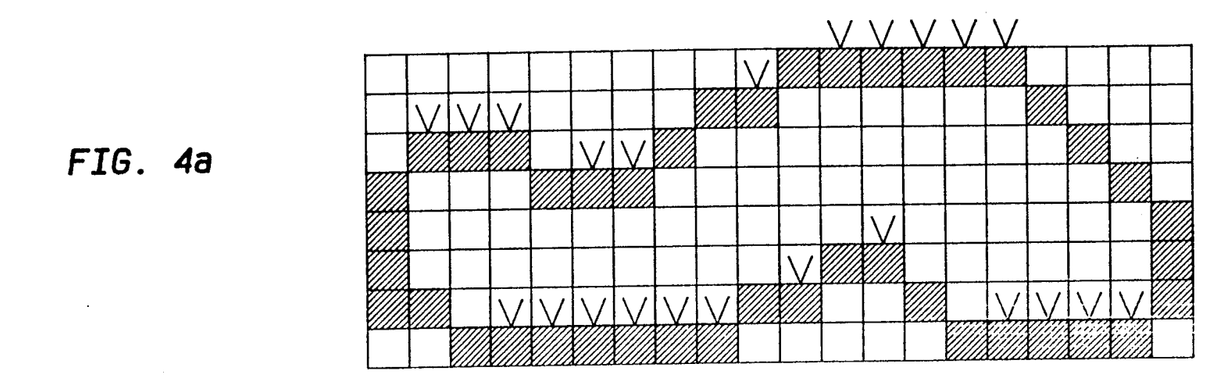
FIG. 4(a) is a view visually illustrating the coordinate data corresponding to each of the pixes on a boundary of the image extraction area designated.

FIG. 4(a) is a view showing coordinate data related to the boundary of the designated area being subjected to extract the image, wherein the coordinate data to be removed are marked by "V".

Figure 4B:
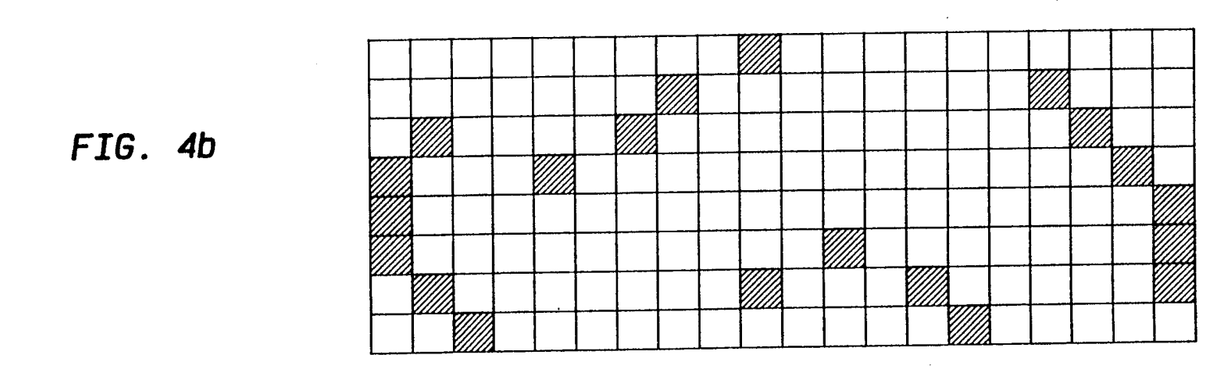
FIG. 4(b) is a view illustrating a state in that data having the minimum x-coordinate value removed from the multiple coordinate data having the same y-coordinate values and continuous x-coordinate values.
Figure 4C:
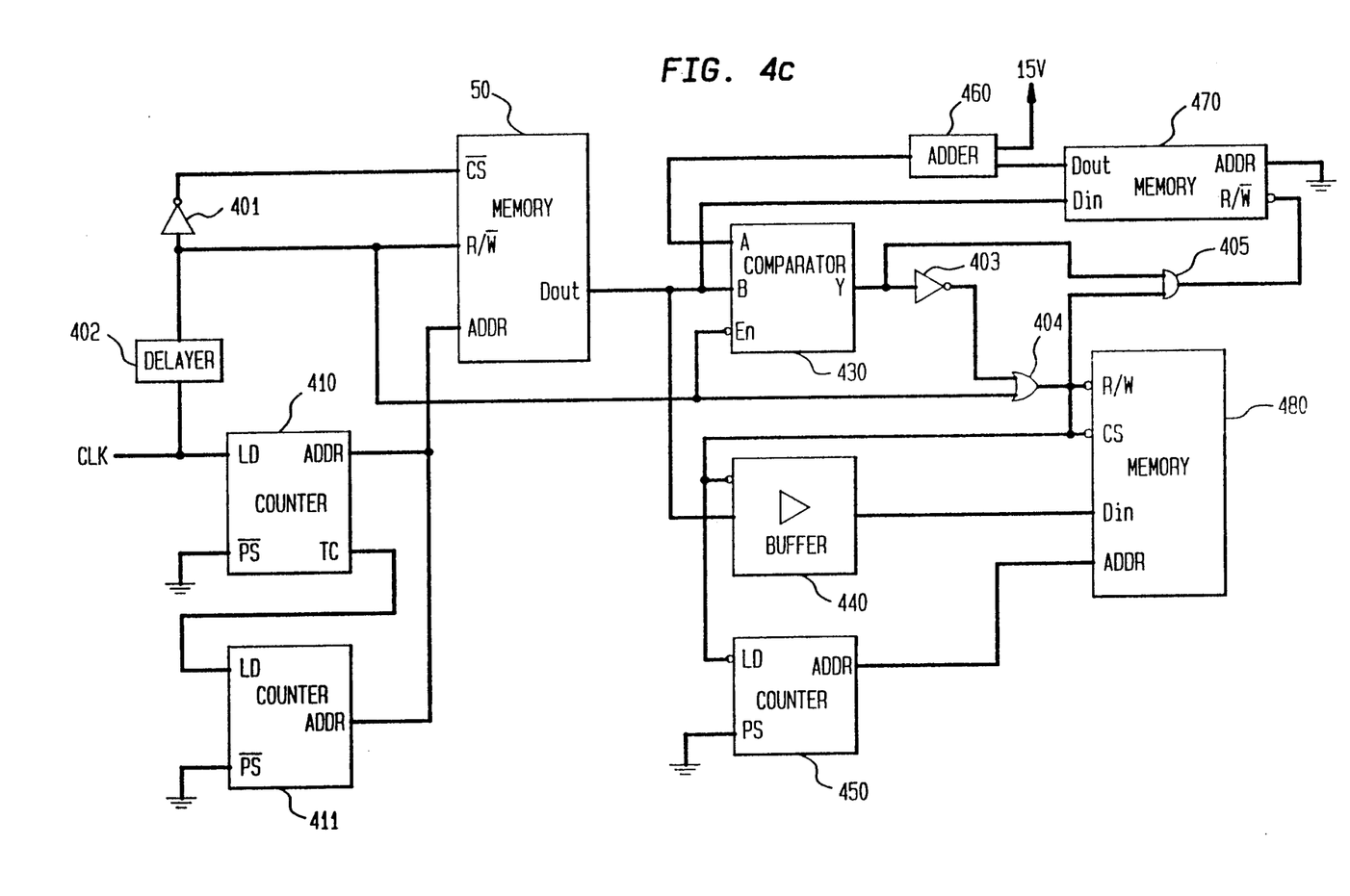
FIG. 4(c) is a block diagram of an embodiment of an adjacent coordinate data removing portion in FIG. 1.

FIG. 4(b) is a view showing a condition where the remaining coordinate data from the data of the minimum X-coordinate value is removed from the multiple coordinate data having the same y-coordinate values and the continuous X-coordinate values. FIG. 4(c) is a view showing a preferred example of the adjacent coordinate data removing portion 400.

The adjacent coordinate data removing portion 400 will be described in detail with reference to FIGS. 4(a) and (c).

The adjacent coordinate data removing portion 400 includes three counters 410, 411 and 450, two memories 470 and 480, a comparator 430, a buffer 440, an adder 460, a delayer 402 and gate circuits 401, 403, 404 and 405.

The counter 410 has a load terminal LD connected to the clock terminal 208 and a carry terminal TC connected to a load terminal LD of the counter 411 and which have output terminals ADDR coupled to address terminals of the coordinate data memory 50, respectively. A data output terminal Dout of the coordinate data memory 50 is connected to an input terminal B of the comparator 430 and an input terminal of the memory 470. The output terminal Dout of the coordinate data memory 50 is also connected to data input terminals of the memory 480. Another input terminal A of the comparator 430 is connected to an output terminal of the adder 460 which is also connected to the output terminal of the memory 470.

The memory 480 has address terminals connected to the output terminal /f the counter 450. An output end of the inverter 403 which inverts the output of the comparator 430 is connected to both input terminals of the OR gate circuit 404.

The following description will be made with reference to the arrangement of the adjacent coordinate data removing portion 400.

Referring to FIG. 4(c), the data stored in an area of the coordinate data memory 50 addressed by the counter 410 and 411 is entered into the input B of the comparator 430, while the data stored in the memory 470 is output as the data having the x-coordinate value added with "1" by the adder 460 and the added data output is then supplied to the input terminal A of the comparator 430.

When the data is supplied to the input terminals A and B of the comparator 430, that is, when two kinds of the data are not coordinate data of adjacent pixels, then the output of the comparator 430 is set to "1".

The output of the comparator 430 is then set to "0" by the inverter 403 and entered to one output terminal of the OR gate circuit 404 of which another input terminal receives the clock signal CLK through the delayer 402.

The OR gate circuit 404 produces the output synchronized with the clock signal CLK delayed by the delayer 402 to set the memory 480 in a write mode so that the data outputted from the coordinate memory 50 is written to the memory 480 and, at the same time, written in the memory 470 as reference data required for comparing with next data.

If the data inputted to the inputs of the comparator 430 are equal to each other, that is, if they represent the coordinate data of adjacent pixels, the output of the comparator 430 is set to "0". Accordingly, the OR gate circuit 404, the buffer 440 and the counter 450 are disabled so that the address of the memory 480 is not increased, and the writing operation to the memory 480 is not performed to thereby remove the coordinate data of the adjacent pixels.

The memory 470 writes the data so as to compare with the next coordinate data. As the above-mentioned operation is continuously executed in relation to the entire coordinate data, it can obtain the resultant data as shown in FIG. 4(b). After the previously described operation is completed, the adjacent coordinate data removing portion 400 requests an interrupt to the CPU 30 so as to indicate the completion of the operation. By the interrupt from the adjacent coordinate data removing portion 400, the CPU 30 executes a software module stored in the coordinate data removing portion 500 to remove the coordinate data corresponding to the maximum and minimum inflected points from the present coordinate data.

FIGS. 5 (a) and (b) are two-dimensional views showing the data array before and after the removal of the inflected point coordinate data. FIGS. 5 (c) and (d) are flow charts for explaining the removal of the coordinate data corresponding to the maximum and minimum inflected points, respectively.

The operation of the inflected point coordinate data removing portion 500 will be described in detail referring to FIG. 5.

Figure 5A:
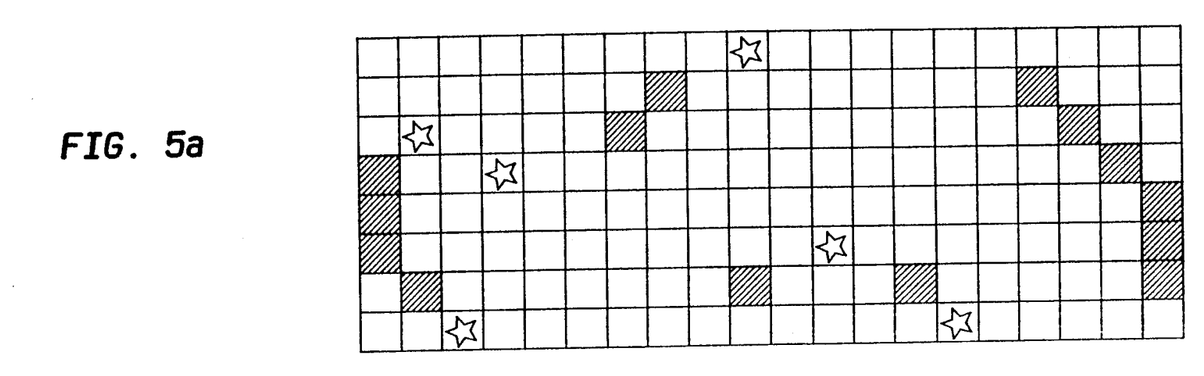
FIGS. 5(a) to (d) are views and flowchart illustrating a process of detecting and removing the coordinate data corresponding to maximum and minimum inflected points.

In FIG. 5(a), the coordinate data of areas marked by a star-shape denote the maximum and minimum inflected points subjected to the data removal process which will be later described.

Figure 5B:
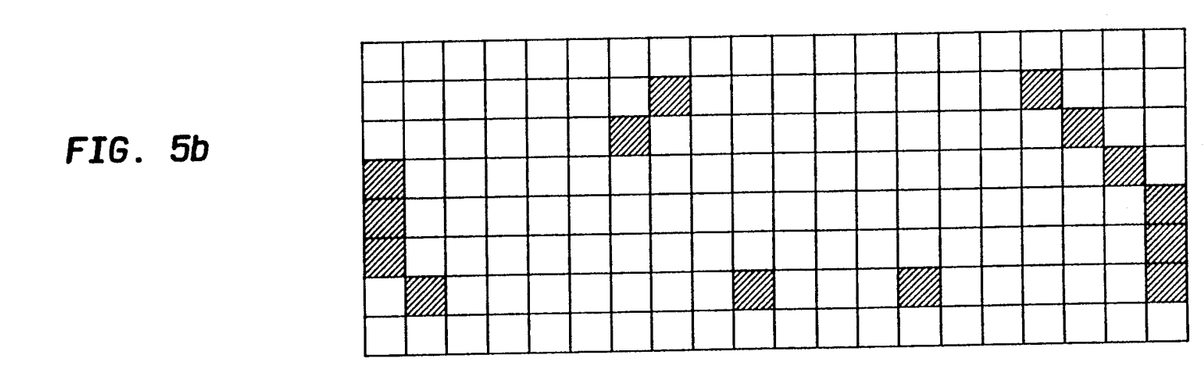
Figure 5C:
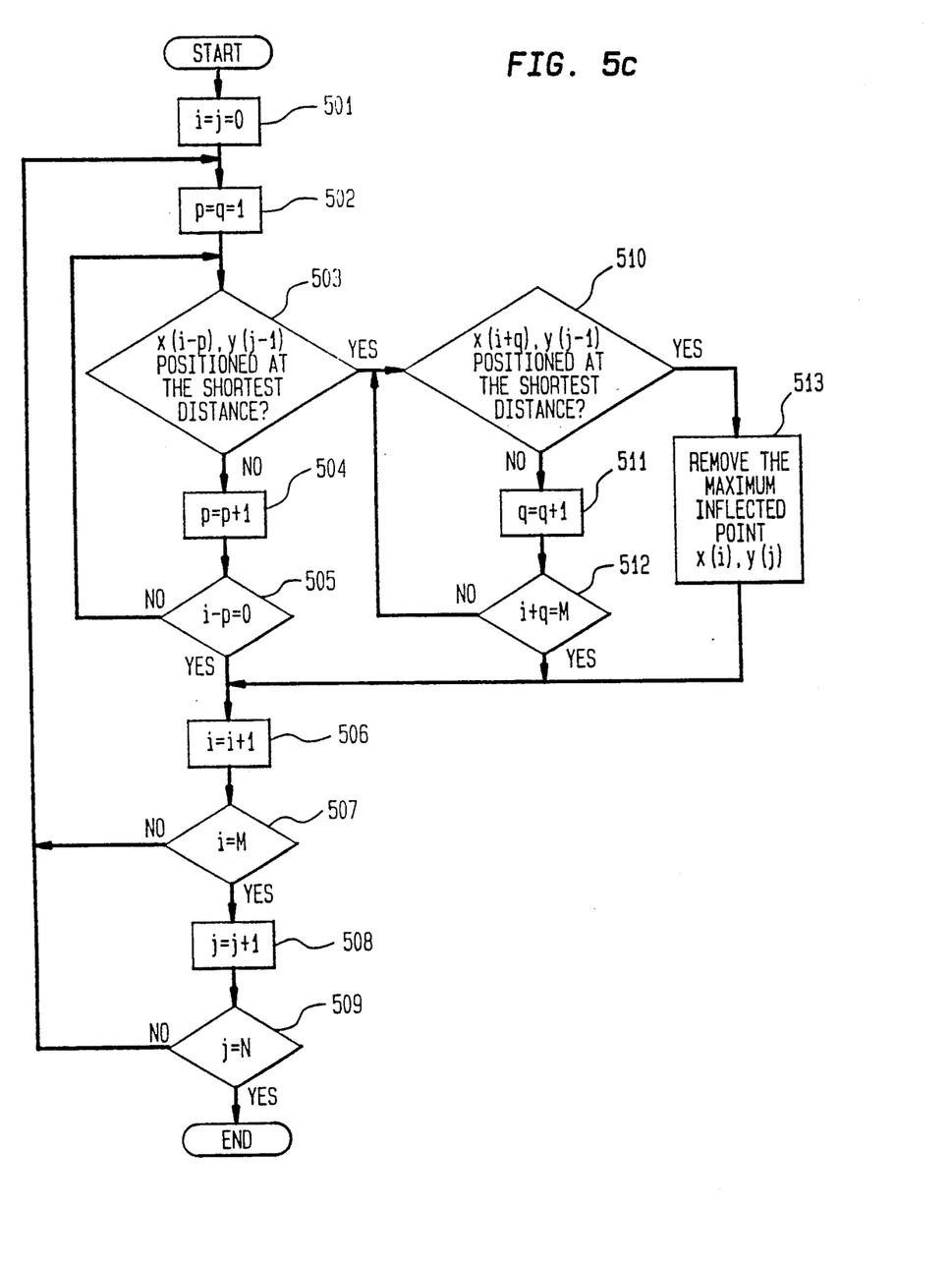

Referring to FIG. 5(c), the process of detecting and removing the coordinate data of the minimum inflected point will be described.

First, it is required to check that the X-coordinate Xi developed on the immediately preceding y-coordinate is positioned at the shortest distance to the present line of the X-coordinate x(i) in the left and right directions. More specifically, when the coordinate $x(i-p)$, $y(j-1)$ (where P=0, 1, 2, dinate x(i), y(j) and the number of the coordinate $x(i+q)$, $y(j-1)$ (where q=1, 2, ... N−1, N denotes the number of pixels presented on the same y-coordinate) is the shortest right coordinate of the coordinate x(i), y(i) (510), the pixels of the present coordinate x(i), y(i) are distinguished as the minimum inflected point pixel and the coordinate data value is then removed (step 513).

Figure 5D:
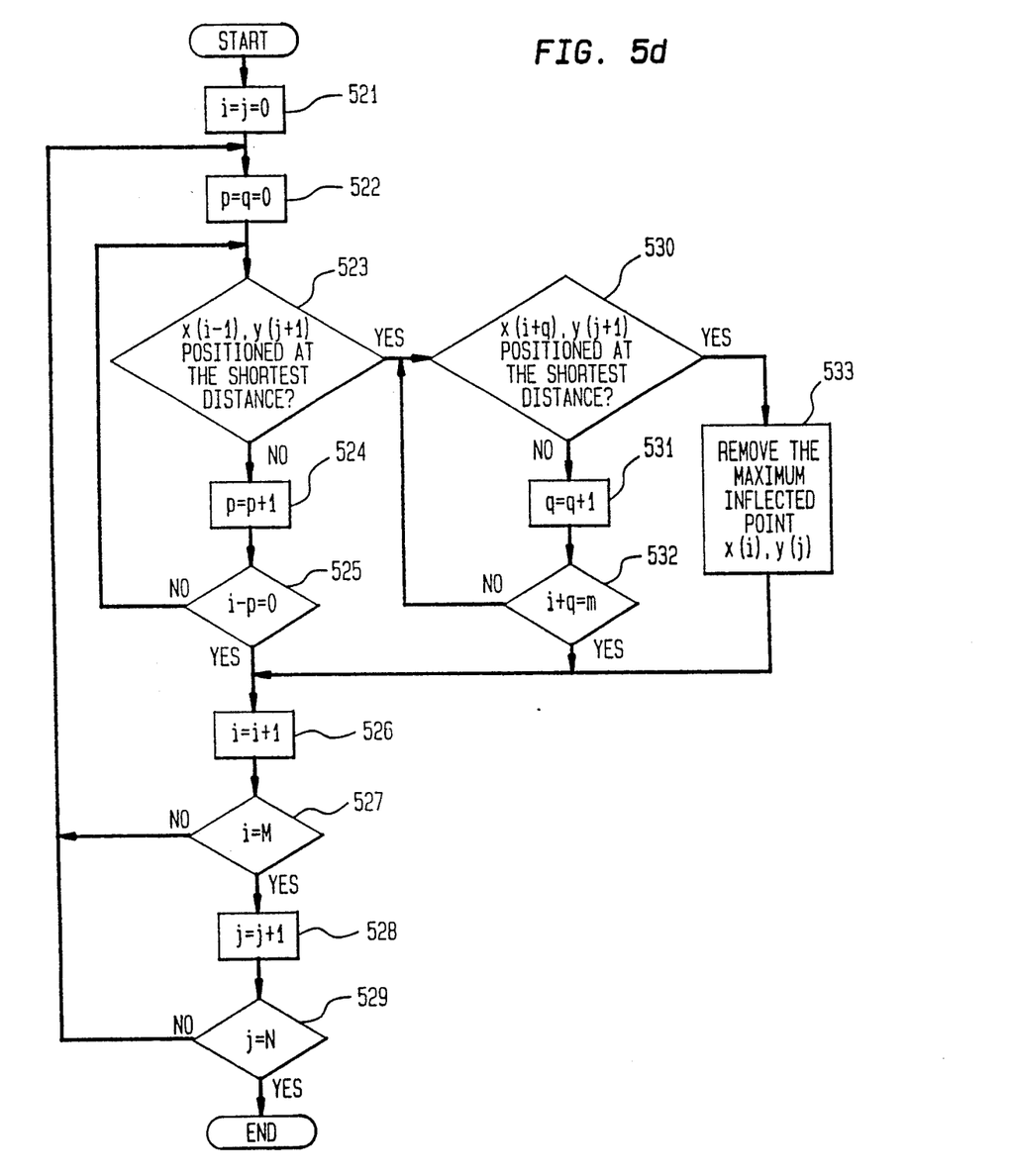

With reference to FIG. 5(d), the process of detecting and removing the coordinate data of the maximum inflected point will be described.

Similar to the method of removing the coordinate data of the minimum inflected point as described above, the check is first executed to determine whether the preceding line x-coordinates presented on the y-coordinate is a coordinate presented at the shortest distance from the present line of the coordinate X(i) in the right and left directions.

That is, when the present coordinate is X(i), Y(i), the coordinate $X(i-P)$, $Y(j+1)$ (where, P=0, 1, 2, ... i−1) is the shortest left coordinate of the present coordinate X(i), Y(i). Alternatively, when the coordinate $X(i+1)$, $Y(i+1)$ (where, q=1, 2, ... N−i) is the shortest right coordinate of the present coordinate (step 530), the pixel corresponding to the present coordinate X(i), Y(j) is detected as the maximum inflected point and the coordinate data thereof is then removed.

FIG. 5(b) is a view illustrating an arrangement of the coordinate data in which the maximum and minimum inflected points are removed.

Upon the completion of the process described above, the CPU 30 drives the synchronizing signal generator 600 to obtain the area control signals Vsync and Hsync on the basis of the coordinate data.

Figure 6:
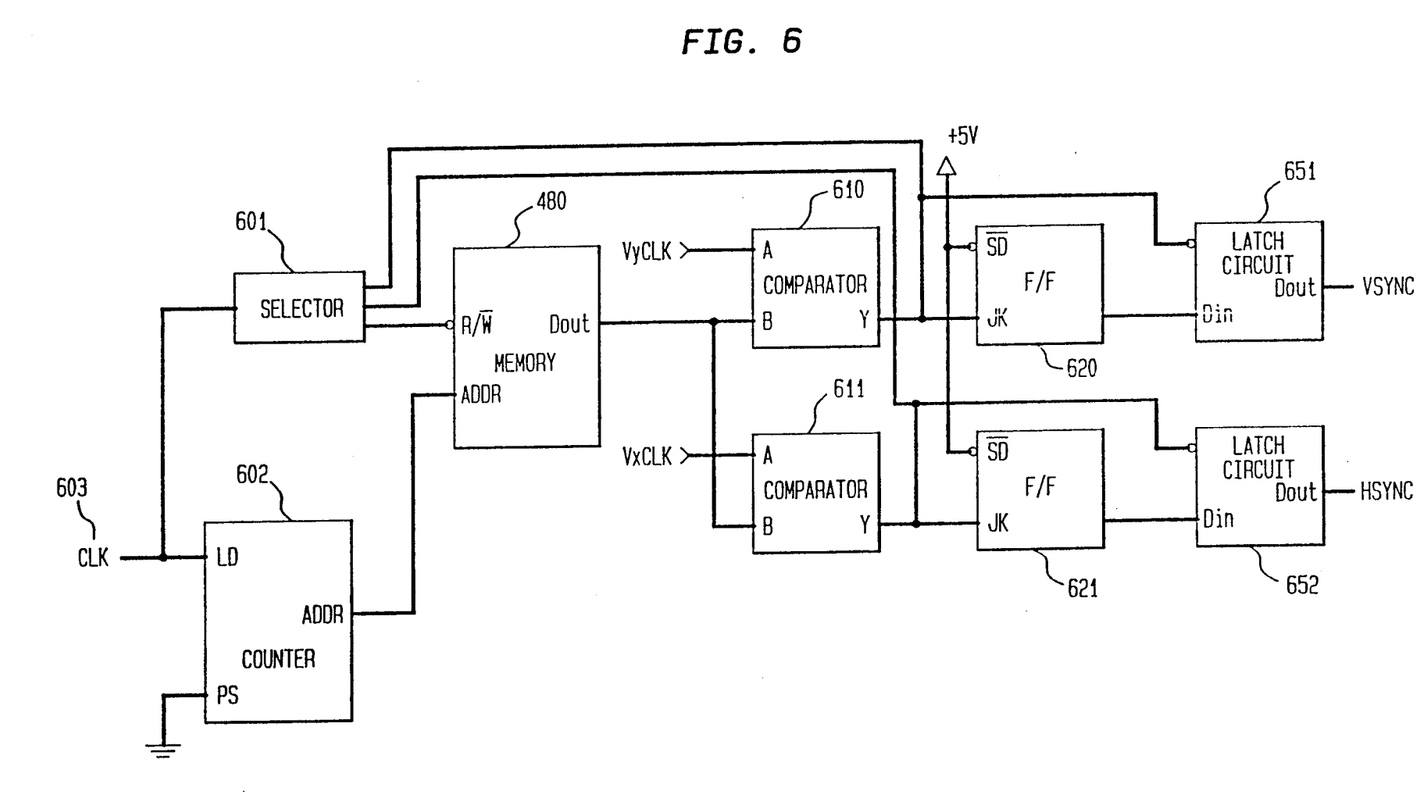
FIG. 6 is a block diagram of an example of a synchronizing signal generator in FIG. 1; and, FIG. 7 is waveforms of horizontal and vertical synchronizing signals suitably used to designate the image area to be extracted.

FIG. 6 shows a detailed circuit diagram of the synchronizing signal generator 600. The synchronizing signal generator 600 comprises a selector 601, a counter 602, a memory 480, comparators 610 and 611 and flip-flop circuits 620 and 621.

The operation of the synchronizing signal generator 600 will be described referring to FIG. 6.

The counter 602 is driven in a synchronized relationship with the clock CLK 603 being generated by a control of the CPU 30 and which produces the output supplied to the memory 480 having the coordinate data stored therein as an address signal.

Reading the data in the memory 480 is executed by using the control signal supplied from the selector 601 which operates in a synchronized manner with the clock CLK. The coordinate data output from the memory 480 is separated into X-and Y-coordinate data, so that the Y-coordinate data is supplied to an input B of the comparator 610 and the X-coordinate data is supplied to an input B of the comparator 611.

Another input A of the comparator 610 receives the Y-coordinate data $V_{yCLK}$ of an image which is inputted through the image input device 20, and another input A of the comparator 611 receives the X-coordinate data $V_{xCLK}$ of the presently inputted image.

The outputs of the comparator 610 and 611 are controlled by the X-and Y-coordinate data $V_{xCLK}$ and $V_{yCLK}$.

Under a control of the selector 601, the vertical synchronizing signal Vsync is set in an active state at the minimum y-coordinate point of the designated image area while it is set in an inactive state at the maximum y-coordinate point.

During the active state of the vertical synchronizing signal Vsync from the J-K flip-flop circuits 620 and 621 driven by the comparator 610 and 611, respectively, the horizontal synchronizing signal Hsync is set in an active state at the odd-numbered X-coordinate in relation to the same y-coordinate while it is set in an inactive state at even-numbered X-coordinate.

The vertical and horizontal synchronizing signals Vsync and Hsync produced by the synchronizing signal generator 600 are latched to the latch circuits 651 and 652 and then supplied to the OR gate circuit 80 (FIG. 1) in accordance with a control of the selector 601.

The logically ORed signal of the vertical and horizontal synchronizing signals Vsync and Hsync outputted from the OR gate circuit 60 is used as control signals that allow the image data stored in the data buffer 70 to be transferred to the image output device.

Figure 7:
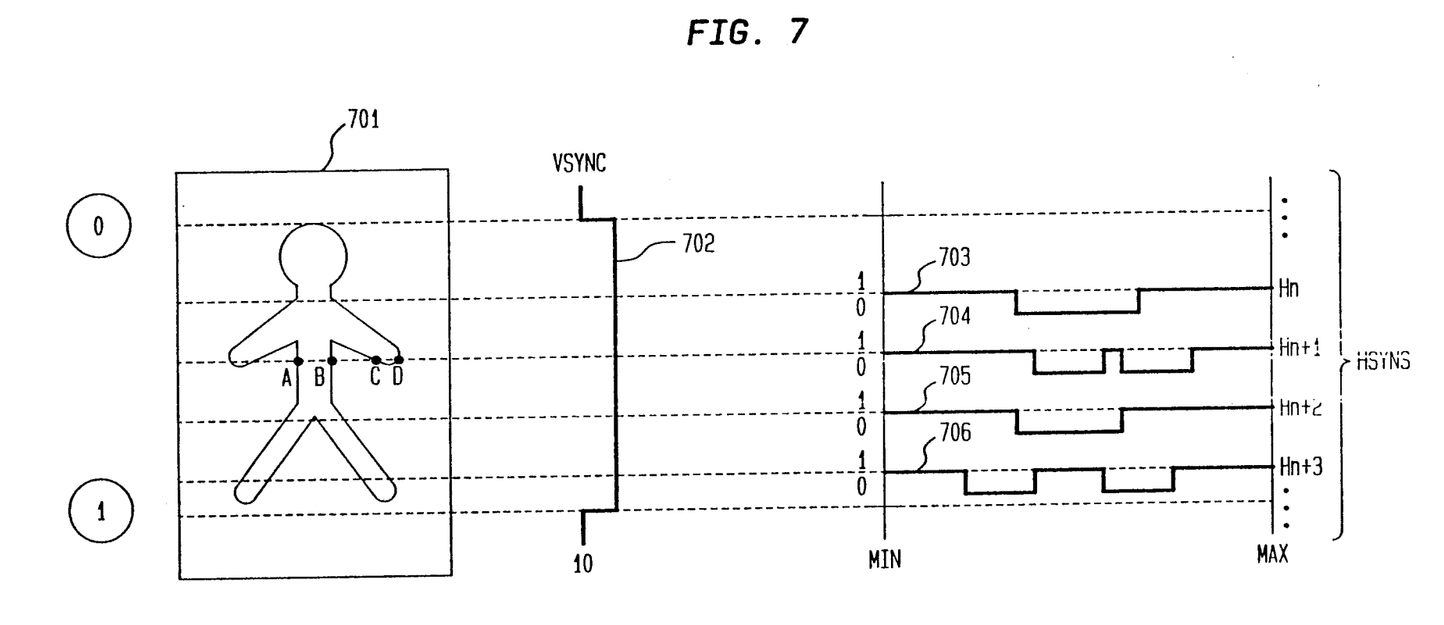

FIG. 7 illustrates an arbitrary local image area designated as an image area to be extracted. In the drawing, if the local area in the left-side image 701 is designated, the vertical synchronizing signal Vsync is in an active state "0" for a period between ⓪ and ①, while multiple horizontal synchronizing signal Hsync (i.e., ... , 703, 704, 705, 706, ... , in the drawing) are alternatively set in such a way that they are in active state at odd-numbered x-coordinate points (i.e., A and C points in FIG. 7) while it is set in an inactive state at even-numbered X-coordinate points (i.e., B and C points in FIG. 7).

The vertical and horizontal synchronizing signals Vsync and Hsync produced as described above are converted to control signals for image area extraction by means of the OR gate circuit 60 in FIG. 1.

Accordingly, the data buffer 70 is controlled by the control signals 20 that it transfers to the image output device 80 only the image data in the vertical and horizontal synchronizing signals Vsync and Hsync that are simultaneously in an active state.

As described above, a format of the image data controlled by the two control signals Vsync and Hsync can be properly designated and has the following advantages.

Firstly, since it is possible to ensure a real time process for the image data, the present invention can be applied to a high-speed color copier.

Secondly, the desired capacity of the memory can be reduced in comparison with the conventional art.

Finally, the designation of arbitrary image areas having a highly complicated format can be achieved.

Although the present invention has been described with reference to the specified embodiment, it should be understood that various changes and modifications can be made therein without departing from the spirit and scope of the invention.

What is claimed is:

1. An apparatus for extracting a local image from an original image which is supplied by an image input unit, said local image corresponding to a local area designated by a coordinate data input unit and being supplied to an image output unit, the apparatus comprising:
   a system control program to generate control signals for said apparatus;
   a central processing unit to operate said system control program;
   a decoder responsive to said control signals to indicate a beginning and an end of an image extraction process;
   storage means for storing coordinate data of boundary pixels positioned at boundary lines between said local image and another portion of said original image;
   correcting means for correcting designated error from uncorrected designation of said local image, such that said coordinate data can be stored in said storage means;
   sorting means for sorting said coordinate data stored in said storage means as x-coordinate data and y-coordinate data with respect to x-y coordinates;
   first detecting means for detecting a plurality of pixels having continuously varying values of x-coordinate with respect to a constant value of y-coordinate, wherein said first detecting means removes other varying values except a minimum value of said continuously varying values;
   second detecting means for detecting data corresponding to maximum and minimum inflected points of said x-y coordinates from coordinate data, wherein said data corresponding to said maximum and minimum inflected points is removed;
   generating means for generating horizontal and vertical synchronizing signals which control said image input unit to provide said local image, said local image being extractable based upon data unremoved from said coordinate data and supplied to said image input unit;
   a latch circuit adapted to temporarily latch said synchronizing signals supplied from said generating means;
   an OR gate circuit adapted to logically OR said synchronizing signals supplied from said latch circuit and provide an output signal; and
   a data buffer circuit adapted to temporarily store said coordinate data corresponding to said local image in accordance with said output signal of said OR gate circuit.

2. The apparatus according to claim 1, wherein said sorting means includes a frequency divider for dividing a clock signal applied externally, a first address generator for generating first predetermined address signals to access said coordinate date stored in said storage means, a first memory for sorting a minimum coordinate data of said coordinate data, and a first comparator for comparing said coordinate data supplied from said storage means with data supplied from said first memory, wherein when said coordinate data from said storage means is less than said data from said first memory, said data from said first memory is stored in said storage means and said coordinate data is stored in said first memory as said minimum coordinate data.

3. The apparatus according to claim 1, wherein said first detecting means includes a second address generator for generating second predetermined address signals to access said coordinate data stored in said storage means, second and third memories for storing the minimum value of said continuously varying values, an adder means for adding "1" to data supplied from said second memory, a second comparator for comparing output signals of said adder means with said coordinate data of said storage means, control means for selectively controlling said second and third memories to store said coordinate data from said storage means in said third memory, and a third address generator for generating third predetermined address signals to access data stored is said third memory.

4. The apparatus according to claim 1, wherein said generating means includes a selector for selecting and controlling reading operation of said third memory in synchronization with said externally applied clock signal, a fourth address generator for generating fourth predetermined address signals to access data stored in said third memory, a third comparator for comparing said y-coordinate data of said data stored in said third memory with said y-coordinate data of said image, a fourth comparator for comparing said x-coordinate data of said data stored in said third memory with said x-coordinate data of said local image, and flip-flop circuit means for synchronizing said horizontal and vertical synchronizing signals with each signal from said third and fourth comparators.

5. The apparatus according to claim 1, wherein said system control program is stored in said apparatus.

6. The apparatus according to claim 1, wherein said correcting means is adapted to sequentially receive said coordinate data of said boundary pixels from said storage means, and check said coordinate data to determine whether an area of said local image is designated correctly.

7. The apparatus according to claim 1, wherein said sorting means sorts said coordinate data in ascending order.

8. The apparatus according to claim 1, wherein said local image is extractable by said central processing unit.

9. An apparatus for extracting a local image from an original image which is supplied by an image input unit, said local image corresponding to a local area designated by a coordinate data input unit and being supplied to an image output unit, the apparatus comprising:
   a system control program stored in said apparatus to generate control signals for said apparatus;
   a central processing unit to operate said system control program;
   a decoder responsive to said control signals to indicate a beginning and an end of an image extraction process;
   storage means for storing coordinate data of boundary pixels positioned at boundary lines between said local image and another portion of said original image;
   correcting means for correcting designated error from uncorrected designation of said local image such that said coordinate data can be stored in said storage means, wherein said correcting means is adapted to sequentially receive said coordinate data of said boundary pixels from said storage means, and check said coordinate data to determine whether an area of said local image is designated correctly;

sorting means for sorting in ascending order said coordinate data stored in said storage means as x-coordinate data and y-coordinate data with respect to x-y coordinates;

first detecting means for detecting a plurality of pixels having continuously varying values of x-coordinate with respect to a constant value of y-coordinate, wherein said first detecting means removes other varying values except a minimum value of said continuously varying values;

second detecting means for detecting data corresponding to maximum and minimum inflected points of said x-y coordinates from coordinate data, wherein said data corresponding to said maximum and minimum inflected points is removed;

generating means for generating horizontal and vertical synchronizing signals which control said image input unit to provide said local image, said local image being extractable by said central processing unit and based upon data unremoved from said coordinate data and supplied to said image input unit;

a latch circuit adapted to temporarily latch said synchronizing signals supplied from said generating means;

an OR gate circuit adapted to logically OR said synchronizing signals supplied from said latch circuit and provide an output signal; and a data buffer circuit adapted to temporarily store said coordinate data corresponding to said local image in accordance with said output signal of said OR gate circuit.

10. The apparatus according to claim 9, wherein said sorting means includes a frequency divider for dividing a clock signal applied externally, a first address generator for generating first predetermined address signals to access said coordinate date stored in said storage means, a first memory for sorting a minimum coordinate data of said coordinate data, and a first comparator for comparing said coordinate data supplied from said storage means with data supplied from said first memory, wherein when said coordinate data from said storage means is less than said data from said first memory, said data from said first memory is stored in said storage means and said coordinate data is stored in said first memory as said minimum coordinate data.

11. The apparatus according to claim 9, wherein said first detecting means includes a second address generator for generating second predetermined address signals to access said coordinate data stored in said storage means, second and third memories for storing the minimum value of said continuously varying values, an adder means for adding "1" to data supplied from said second memory, a second comparator for comparing output signals of said adder means with said coordinate data of said storage means, control means for selectively controlling said second and third memories to store said coordinate data from said storage means in said third memory, and a third address generator for generating third predetermined address signals to access data stored is said third memory.

12. The apparatus according to claim 9, wherein said generating means includes a selector for selecting and controlling reading operation of said third memory in synchronization with said externally applied clock signal, a fourth address generator for generating fourth predetermined address signals to access data stored in said third memory, a third comparator for comparing said y-coordinate data of said data stored in said third memory with said y-coordinate data of said image, a fourth comparator for comparing said x-coordinate data of said data stored in said third memory with said x-coordinate data of said local image, and flip-flop circuit means for synchronizing said horizontal and vertical synchronizing signals with each signal from said third and fourth comparators.

13. An apparatus for extracting a local image from an original image which is supplied by an image input unit, said local image corresponding to a local area designated by a coordinate data input unit and being supplied to an image output unit, the apparatus comprising:

a system control program stored in said apparatus to generate control signals for said apparatus;

a central processing unit to operate said system control program;

a decoder responsive to said control signals to indicate a beginning and an end of an image extraction process;

storage means for storing coordinate data of boundary pixels positioned at boundary lines between said local image and another portion of said original image;

correcting means for correcting designated error from uncorrected designation of said local image, such that said coordinate data can be stored in said storage means, wherein said correcting means is adapted to sequentially receive said coordinate data of said boundary pixels from said storage means, and check said coordinate data to determine whether an area of said local image is designated correctly;

sorting means for sorting in ascending order said coordinate data stored in said storage means as x-coordinate data and y-coordinate data with respect to x-y coordinates, said sorting means including a frequency divider for dividing a clock signal applied externally, a first address generator for generating first predetermined address signals to access said coordinate date stored in said storage means, a first memory for sorting a minimum coordinate data of said coordinate data, and a first comparator for comparing said coordinate data supplied from said storage means with data supplied from said first memory, wherein when said coordinate data from said storage means is less than said data from said first memory, said data from said first memory is stored in said storage means and said coordinate data is stored in said first memory as said minimum coordinate data;

first detecting means for detecting a plurality of pixels having continuously varying values of x-coordinate with respect to a constant value of y-coordinate, wherein said first detecting means removes other varying values except a minimum value of said continuously varying values, and includes a second address generator for generating second predetermined address signals to access said coordinate data stored in said storage means, second and third memories for storing the minimum value of said continuously varying values, an adder means for adding "1" to data supplied from said second memory, a second comparator for comparing output signals of said adder means with said coordinate data of said storage means, control means for selectively controlling said second and third memories to store said coordinate data from said storage means in said third memory, and a third address generator for generating third predetermined address signals to access data stored is said third memory;

second detecting means for detecting data corresponding to maximum and minimum inflected points of said x-y coordinates from coordinate data, wherein said data corresponding to said maximum and minimum inflected points is removed;

generating means for generating horizontal and vertical synchronizing signals which control said image input unit to provide said local image, said local image being extractable by said central processing unit and based upon data unremoved from said coordinate data and supplied to said image input unit, wherein said generating means includes a selector for selecting and controlling reading operation of said third memory in synchronization with said externally applied clock signal, a fourth address generator for generating fourth predetermined address signals to access data stored in said third memory, a third comparator for comparing said y-coordinate data of said data stored in said third memory with said y-coordinate data of said image, a fourth comparator for comparing said x-coordinate data of said data stored in said third memory with said x-coordinate data of said local image, and flip-flop circuit means for synchronizing said horizontal and vertical synchronizing signals with each signal from said third and fourth comparators;

a latch circuit adapted to temporarily latch said synchronizing signals supplied from said generating means;

an OR gate circuit adapted to logically OR said synchronizing signals supplied from said latch circuit and provide an output signal; and a data buffer circuit adapted to temporarily store said coordinate data corresponding to said local image in accordance with said output signal of said OR gate circuit.

* * * * *

UNITED STATES PATENT AND TRADEMARK OFFICE
CERTIFICATE OF CORRECTION

PATENT NO. : 5,307,454
DATED : April 26, 1994
INVENTOR(S) : Jae-Sub Shin

It is certified that error appears in the above-indentified patent and that said Letters Patent is hereby corrected as shown below:

Column 11, line 63, cancel "date" and insert therefor --data--;

Column 12, line 19, cancel "is" and insert therefor --in--;

Column 13, line 42, cancel "date" and insert therefor --data--, and in line 66, cancel "is" and insert therefor --in--;

Column 14, line 46, cancel "date" and insert therefor --data--; and

Column 15, line 8, cancel "is" and insert therefor --in--.

Signed and Sealed this

Sixteenth Day of August, 1994

*Attest:*

BRUCE LEHMAN

*Attesting Officer*  *Commissioner of Patents and Trademarks*